Patented Apr. 21, 1936

2,037,802

UNITED STATES PATENT OFFICE 2,037,802

ROOFING GRANULE AND PROCESS OF MAKING THE SAME

Edward A. Leonard, Chicago, Ill., assignor to Orenda Corporation, Chicago, Ill., a corporation of Illinois No Drawing. Application December 30, 1933, Serial No. 704,750

7 Claims. (Cl. 25—156)

This invention relates to roofing granules, and particularly to flat ceramic granules, and to the method by which such granules are made. According to the present invention the clay is worked to a suitable plastic condition, a coloring matter being added if desired, and then spread in a thin layer of not over one-sixteenth inch thickness, and preferably slightly less, dried, crushed and screened, the resulting granules of the right size being burned to a hard, substantially insoluble state. Due to being formed from a flat thin layer of clay, the granules have the flat disk-like characteristic of the best roofing slates, although they are superior to the slates in that the color and thickness may be controlled at will and there is no dependence on natural sources. Also the fines may be remixed with the other raw clay, instead of being wasted.

It has formerly been proposed to break up soft shale and harden the resulting particles by burning, but such practice does not have the advantages above mentioned, and in addition the particles project irregularly, and often too far into the shingle on which they are used. It has also been proposed to crush a "firmly consolidated massive clay" but without any idea of obtaining a flat product, and without any idea of breaking the particle up from thin layers. As a matter of fact, the production of flat granules from clay, had it been thought of prior to this invention, would have been considered impossible. At least one impractical method has been proposed.

From the foregoing it will be understood that the primary object of this invention is to produce in a practical manner, a body of granules which are predominantly flat, and by flat granules is meant granules which have relatively flat top and bottom surfaces substantially parallel to each other, the thickness between said surfaces being less than the length of the granule along said surfaces in a direction parallel to the surfaces.

In practicing the invention almost any clay may be used which is suitable for general ceramic use. Of course, as in the art of ceramics certain clays are better for some colors than others. One clay which has been found very satisfactory for green is a clay which has the following analysis by weight as it is mined, the remainder being water and organic matter:

|  | Per cent |
| --- | --- |
| Silica | 62.60 |
| Iron oxide | 4.26 |
| Alumina | 22.42 |
| Lime | 1.29 |
| Magnesia | 1.14 |
| Total alkalies | 2.15 |
| Sulphur | Trace |

To this clay is added chromium oxide to about 5% of the weight of the clay as mined. This percentage may be varied according to the particular clay, enough in any case being used to produce the particular shade of green desired. In general it may be said that the more iron oxide there is in the clay the more chromium oxide must be used to color this clay green. Of course for other colors, other coloring constituents will be added, and other clays may be used if desired.

The clay is mixed with water to a heavy slurry consistency either before or after the color is added, it being preferred to add the water first. The mixing is continued until the color is well and uniformly dispersed, and the colored clay is then formed into thin sheets of preferably about one thirty-second inch or three sixty-fourths inch thickness. The exact thickness will depend upon the purpose for which the granule is intended, and although applicant does not believe that for the purpose of roofing he would want the layer to be over one-sixteenth inch thickness, for other purposes the desired thickness might be considerably greater. The thin sheets of clay may be formed either by spreading them on slabs, this being more satisfactory for small quantities, or by forming them continuously on a belt and scraping or rolling them to the desired thickness. The belt may run through the slurry mixture, or the mixture may be fed to the belt in any well known manner. In any event the clay sheet, after being reduced to the right thickness, is carried by the belt or on the slabs to a drying oven which dries out substantially all the excess moisture. The drying is carried on until the clay is sufficiently brittle to be satisfactorily broken up and screened. After screening, the undesired screenings could be returned to the mixture and worked with more material and the desired screenings would then be placed in a suitable ceramic kiln, preferably of a refractory tunnel type, and burned to the proper hardness. The clay for which the analysis is given has a fusion point of approximately 2745° F., and it is preferred that it be not heated over 2200° F. With any clay it is preferred for most purposes that the temperature of the clay be kept below its fusion point, since a glaze is usually undesirable. Particularly in roofing, the porous or unglazed granule is preferred, other qualities being the same, since the porous granule adheres better to the asphalt of the shingle than does a glazed granule.

Glazed granules have frequently been used in roofing, but they must depend for their adherence largely upon their irregularities of shape, which means that they must penetrate objectionably far into the asphalt. The flat granule of the present invention, although being aided by slight irregularities of shape is held securely in place on account of its porosity.

It is to be understood that many other embodiments of the invention, including some in improved form, will be apparent, and in the course of time more will be devised by those skilled in the art. It is not desired that this invention be limited to the details described, for its scope includes all such forms or improvements as come within the spirit of the following claims, construed as broadly as the prior art will permit.

What is claimed is:

1. A flat granule formed of burned clay artificially colored throughout the granule and having a shape similar to a slate granule in that its top and bottom surfaces are substantially parallel, the thickness of the granule between said surfaces being less than its length along said surfaces.

2. The method of making a flat granule which comprises forming from plastic clay a sheet the thickness of which is substantially the thickness desired between the flat sides of the finished granule, drying said sheet to a relatively brittle state, breaking up said sheet into granules, and burning such granules as are of proper size to the desired degree of hardness and insolubility.

3. The method set forth in claim 2 in which a suitable coloring matter is mixed into the clay prior to its original drying.

4. The method set forth in claim 2 in which the sheet is formed continuously from the clay by spreading the clay out on a flat surface to the desired thickness.

5. The method of making a flat granule which comprises continuously spreading plastic clay on a conveyor to form continuously a sheet, the thickness of which is substantially the thickness which after burning will yield the thickness desired between the flat sides of the finished granule, drying off the excess moisture from the clay by conveying it on said conveyor through a drying chamber until it is in such condition that it may be broken up, breaking up said sheet into granules, and hardening by heat such of said granules as are of proper size to the desired degree of hardness and insolubility.

6. The method of making a flat granule which comprises forming a body of plastic clay, the thickness of which is substantially the thickness which after burning will yield the thickness desired between the flat sides of the finished granule, partially drying said sheet to a condition in which it may be broken up, breaking up said sheet into granules, and hardening such of said granules as are of proper size to the desired degree of hardness and insolubility.

7. The method of making a flat granule which comprises forming a body of plastic clay, the thickness of which is substantially the thickness desired between the flat sides of the finished granule, partially drying said sheet to a condition in which it may be broken up, breaking up said sheet into granules, and burning such granules as are of proper size to the desired degree of hardness and insolubility.

EDWARD A. LEONARD.

DISCLAIMER 2,037,802.—*Edward A. Leonard*, Chicago, Ill. ROOFING GRANULE AND PROCESS OF MAKING THE SAME. Patent dated April 21, 1936. Disclaimer filed February 14, 1938, by the assignee, *The Lehon Company*.

Hereby enters this disclaimer to claims 1, 2, 3, 6, and 7 in said specification.

[*Official Gazette, March 15, 1938.*]